United States Patent [19]

Darden

[11] Patent Number: 5,204,894
[45] Date of Patent: Apr. 20, 1993

[54] PERSONAL ELECTRONIC DIRECTORY
[75] Inventor: Pamela Darden, Philadelphia, Pa.
[73] Assignee: Bell Atlantic Network Services, Inc., Arlington, Va.
[21] Appl. No.: 610,881
[22] Filed: Nov. 9, 1990
[51] Int. Cl.[5] .................. H04M 1/50; H04M 1/56; H04M 3/42
[52] U.S. Cl. .................. 379/88; 379/213; 379/216; 379/355
[58] Field of Search .................. 379/88, 89, 67, 354, 379/355, 216, 213

[56] References Cited

U.S. PATENT DOCUMENTS

| | | | |
|---|---|---|---|
| 3,618,038 | 12/1969 | Stein . | |
| 3,928,724 | 12/1975 | Byram et al. | 379/80 |
| 4,427,848 | 1/1984 | Tsakanikas | 379/88 |
| 4,554,418 | 11/1985 | Toy | 379/88 |
| 4,593,157 | 6/1986 | Usdan | 379/89 |
| 4,608,460 | 8/1986 | Carter et al. | 379/71 |
| 4,677,569 | 6/1987 | Nakano et al. | 364/513.5 |
| 4,677,659 | 6/1987 | Dargan | 379/97 |
| 4,747,124 | 5/1988 | Ladd | 379/67 |
| 4,782,509 | 11/1988 | Shepard | 379/88 |
| 4,817,129 | 3/1989 | Riskin | 379/88 |
| 4,873,714 | 10/1989 | Ishii et al. | 379/88 |
| 4,928,302 | 5/1990 | Kaneuchi et al. | 379/88 |
| 5,012,511 | 4/1991 | Hanle et al. | 379/211 |

OTHER PUBLICATIONS

"Now Let Your Computer Reach Out", Anita Seelig, Computer & Electronics, Apr. 1984, pp. 56-59, 109-112 [379/88].
"Spoken Nickname Recognition Telephone Dialer", IBM Tech. Disclosure Bulletin, vol. 31, No. 10, Mar. 1989, pp. 220,221.

Primary Examiner—Thomas W. Brown
Attorney, Agent, or Firm—Lowe, Price, LeBlanc & Becker

[57] ABSTRACT

A central office based service and apparatus whereby personal electronic directory (PED) subscribers may call a special number from any DTMF telephone to access their personal directory. Such users dial a special telephone number, enter their personally selected code for their directory and follow the system prompts which explain all available options and the methodology of use. The personal code is changeable by the subscriber at any time. The PED provides subscribers the ability to store names and numbers through audio signals which are preferably the subscriber's voice. The subscriber then may access his PED remotely from any DTMF telephone and have a requested name and number repeated back in the subscriber's own voice. Each entry is addressed by a portion of the name chosen by the subscriber. In case of multiple entries under the same name portion the system provides for seriatim search and announcement of the entries under that address until an affirmative response is entered by the calling subscriber. As an option the subscriber may have the number automatically dialed. The system provides subscriber access to the PED for changing, erasing or addition of entries at any time from any DTMF telephone, or of changing their personally selected code.

15 Claims, 8 Drawing Sheets

PERSONAL ELECTRONIC DIRECTORY

TECHNICAL FIELD

This invention relates generally to special or enhanced services in telephone networks and more particularly to a method and system for providing a personal electronic directory which provides remote access.

BACKGROUND ART

Those familiar with the current state of the telephone art are aware that there have been numerous and varied proposals for providing directory assistance through telephonic access to centralized data banks such as metropolitan telephone number directories. These systems generally comprise arrangements for accessing the data through a standard "Touch Tone" (DTMF) key pad and have encompassed a large variety of schemes for eliminating the ambiguities caused by the multiple alphanumeric characters signified by each key.

U.S. Pat. No. 4,427,848 to Tsakanikas describes a system wherein alphabetic characters are transmitted by depressing a designated key a number of times equal to the relative position of the inscription of the character on the key, followed by the depression of the key on which the character is inscribed.

Systems which are known in the simultaneous depression of a plurality of keys are used to produce a signal having frequency characteristics which may be discriminated from the pairs of frequencies generated in response to the depression of a single key.

U.S. Pat. No. 3,618,038 to Stein utilized what is known as the delayed depression translation technique, wherein depression of keys having different durations are discriminated.

These systems in general are slow, tedious, involve a coding scheme which is difficult for a user to master, and are more or less impractical for general acceptance or use. This problem has been recognized and produced various other proposals for surmounting certain aspects of the difficulties.

U.S. Pat. No. 4,677,659 to Dargan teaches a DTMF system which is usable without employing an encoding scheme for each alphabetic letter. According to this patent the principle of Boolean exclusion is used in a specific fashion to discriminate among data base entries indexed by numerals matching the letters designated on a standard DTMF telephone key pad. At the same time this system discriminates among separate entries with matching index numbers by the content of their informational fields. This is accomplished by multiple strings of key pad entries defining progressively larger percentages of the content of the informational field.

U.S. Pat. No. 4,817,129 to Riskin describes DTMF access to a data base by utilizing a system of filettes which comprise abbreviated versions of the data base.

U.S. Pat. No. 4,782,509 to Shepard is directed to an automatic directory assistance system which is usable over a large geographic area involving a plurality of local exchanges. The party seeking assistance enters all of the request data through the DTMF keys. Assistance is provided in the form of a voice response identifying the name of the sought subscriber and the telephone number. It is a feature of this patent that the DTMF signals are transformed to digital form for processing. The located alphanumeric information including name and telephone number is then sent back through the digital transmission system to the request processor. The alphanumeric code data is used at that processor to control a voice response unit.

U.S. Pat. No. 3,928,724 to Byram is directed to a voice actuated automatic telephone directory assistance system wherein the user verbally spells the name of the sought party letter by letter.

U.S. Pat. No. 4,593,157 to Usdan is directed to automatic directory assistance responsive to speech recognition circuitry. The response to the inquiry is provided in the form of a display on the inquiring instrument. An automatic dial out feature is included.

U.S. Pat. No. 4,608,460 to Carter et al discloses a comprehensive automatic directory assistance apparatus that is subscriber accessed through a conventional telephone exchange and which receives DTMF input signals and responds via synthesized voice. At the option of the caller connection may be automatically made to the identified subscriber. The methodology comprises obtaining from the caller a limited number of key depressions to spell the last name of the sought party even though this may not completely spell that name. On the instances where the data bank contains multiple matches to the limited information provided by the caller the caller is presented with a selection of all such matches vocally for selection by depressing a predesignated DTMF key. Optionally the caller can elect to have the selected number dialed automatically by the system.

While all of the foregoing systems are theoretically feasible for providing an automatic electronic telephone directory for public access they individually suffer varying disadvantages, such as for example, substantial cost, special equipment, complex establishment and maintenance procedures and modification of existing networks.

DISCLOSURE OF THE INVENTION

It is a primary object of the present invention to provide a unique central office based service and system which will provide to telephone subscribers a simple, economic, effective and intangible personal and individual telephone directory of an unusually secure nature.

It is another object of the present invention to provide such a personal electronic directory which is easily created or established by the user and is subject to correction, erasure and addition through the use of simple and straightforward procedures.

It is still another object of the invention to provide a central office based personal electronic directory system which is simple and user friendly and which requires little or no reference to written materials for the user to establish, revise or use.

It is another object of the invention to provide an improved system and method for providing a personal and secure electronic directory which is remotely accessible to the subscriber and creator of the directory from any accessible DTMF telephone.

It is another object of the invention to provide a personal electronic directory which comprises a central office based telephone number storage and retrieval service which allows customers to create and maintain their own personal directory of telephone numbers using a "Touch Tone" telephone and a personal and user changeable code.

It is another object of the invention to provide customers a central office based personal electronic directory with the ability to save, add, change, erase and obtain any number they have entered in their directory with the optional added convenience and accuracy of automatic dialing any number selected.

It is still another object of the invention to provide a personal electronic directory which offers security and privacy of all numbers stored therein.

In accordance with the invention Personal Electronic Directory (PED) subscribers may call a special number from any Touch Tone telephone to access their personal directories. Such users may dial a special telephone number, enter their personal code and then follow the system prompts which explain all available options and the simple methodology of its use. The personal code may preferably be four digits long and may be changed by the subscriber at any time from any telephone. The PED will provide customers the ability to store and retrieve telephone numbers, access their directory remotely from any DTMF telephone, have the number automatically dialed, enjoy the security of having telephone numbers intangibly stored, some of which may be unlisted, without need to worry about losing or forgetting such telephone numbers. The PED is intangible to the user and completely eliminates the necessity of having to carry a personal directory in a book or the like. When it is recognized that the private number service market comprises approximately 20-30% of the average telephone company customer body it is apparent that a lost telephone directory containing such numbers may be a serious matter. The private lost numbers are simply unattainable from directory assistance. The remote accessibility of the directory is attractive to persons in transit particularly in mobile and portable phone vehicles. Customers can call a special (800) number to access the system when away from home or may call a special local number.

These and further objects and features of the invention will become more apparent to those skilled in the art from the following descriptions when read in conjunction with the accompanying drawings wherein there are shown and described preferred embodiments of the invention simply by way of illustration of the best modes contemplated for carrying out the invention. As will be realized the invention is capable of other, different embodiments and its several details are capable of modifications in various obvious aspects, all without departing from the invention. Accordingly the drawings and descriptions will be regarded as illustrative in nature and not as restrictive.

BEST MODE FOR CARRYING OUT THE INVENTION

Figure 1:
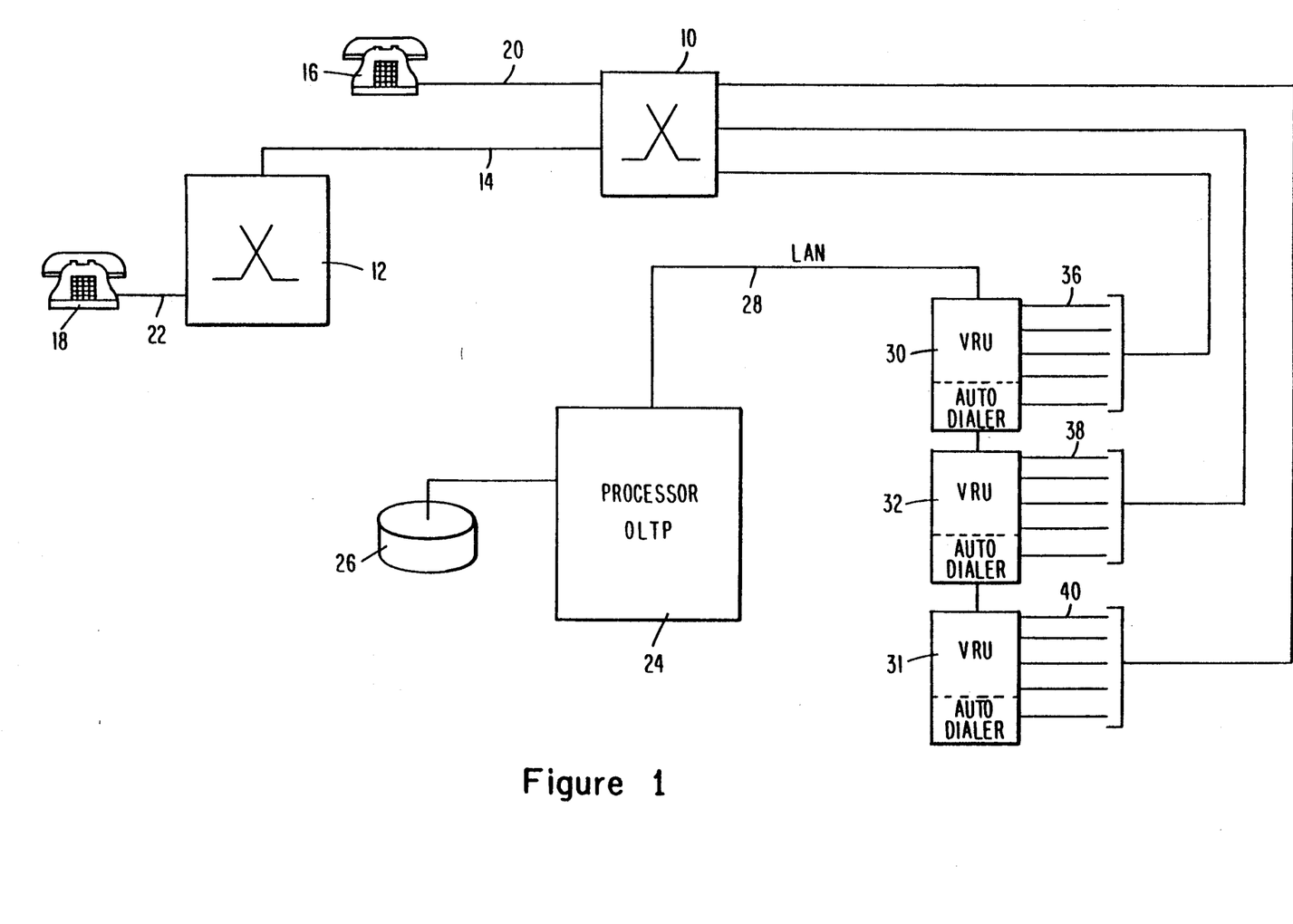
FIG. 1 is a diagrammatic illustration of one embodiment of the invention.

Referring to FIG. 1 a telecommunications network is diagrammatically indicated by a plurality of central office switches 10 and 12 connected by a trunk 14. Each central office switch is connected to a large number of subscriber stations 16 and 18 by subscriber loops diagrammatically indicated at 20 and 22.

According to the invention there is provided within this network a fault tolerant computer processor or On-Line Transactional Processor (OLTP) 24. By way of example the OLTP computer may be a Sequoia Model 200, a 68020 based computer. The computer is provided with a large capacity memory 26. Connected to the OLTP by a local area network (LAN) 28 is at least one and normally a plurality of voice response units (VRU) 30, 32 and 34. The VRUs are linked by the LAN as indicated and provide an expandable capacity through the addition of VRU units. The VRU may be a Periphonics Voice Response Unit or IBM 28636 PC. These latter units have the AT back plane to which voice response cards may be added to provide the capability for digitized voice storage and DTMF recognition. Another example of a VRU is the Dialogic Voice Response Unit. According to the preferred embodiment of the invention the VRU units are provided with voice recognition capabilities as will be described.

Each VRU is connected to a multiline hunt group 36, 38 and 40 which in turn are connected to the central office switch 10. The multiline hunt groups are collectively associated with a remote Personal Electronic Directory Number (PEDN). The PEDN may constitute a seven digit number but preferably is a free call (800) number. This will allow customers to dial a toll free number when they are outside their local area. Also, since (800) service is provided by an Intelligent Network of the type described in AT&T publication 235-190-125, October, 1990, it is possible to change the location of the OLTP/VRU nodes or add additional nodes without having to change the access number that the customer dials. An (800) number also provides the capability to offer a single number to access the service nationwide. Alternatively local PEDNs may be provided.

Figure 2:
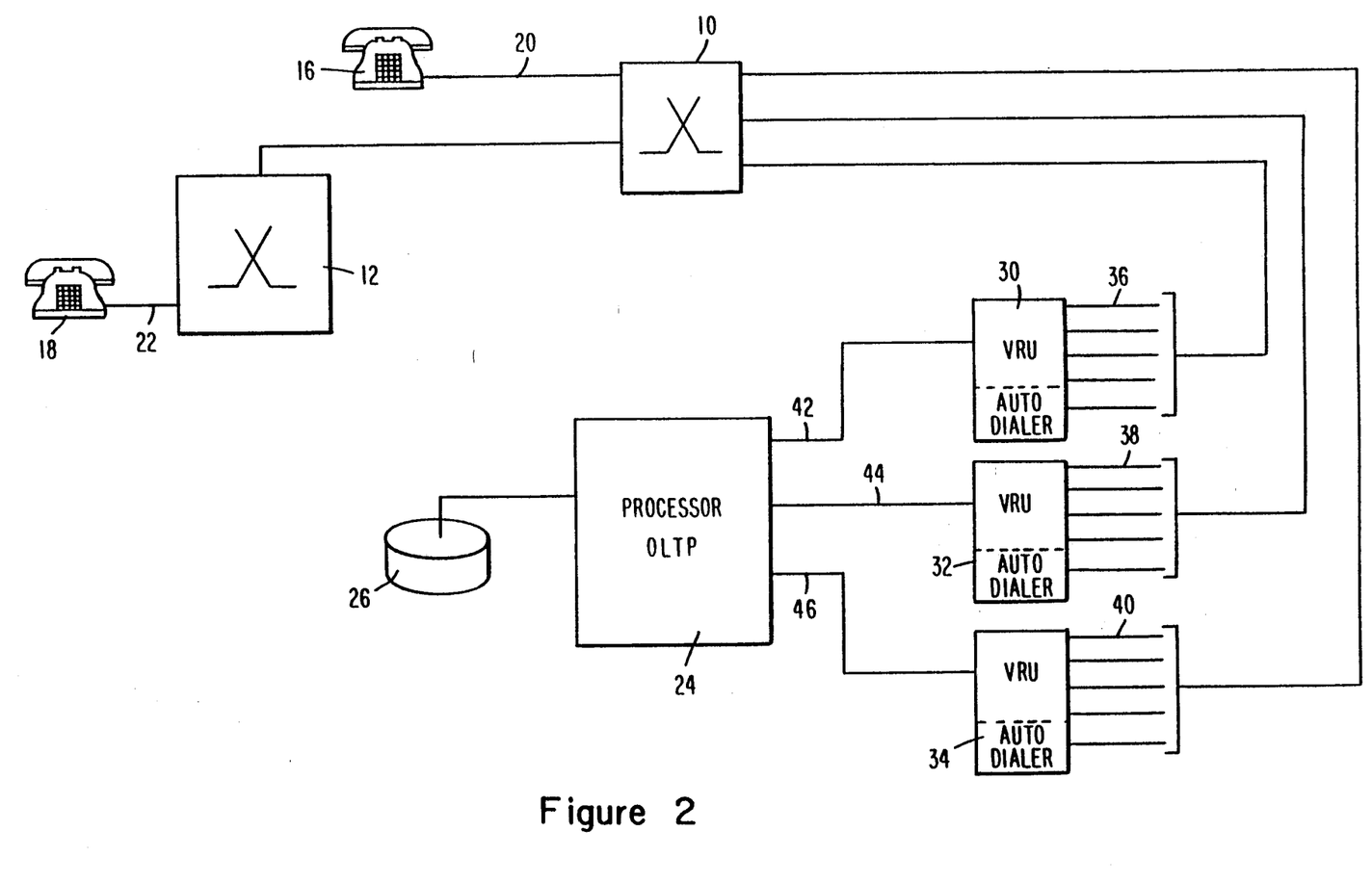
FIG. 2 is a diagrammatic illustration of a second embodiment of the invention.

Referring to FIG. 2 there is shown a second embodiment of the invention. In FIG. 2 there is shown a telephone network similar to that illustrated and described in connection with FIG. 1 which also has been provided with an OLTP and VRU units. Similar reference numbers are used to indicate like units. The embodiment illustrated in FIG. 2 differs from the embodiment in FIG. 1 in that the VRU units 30, 32 and 34 are separately connected to the OLTP by asynchronous lines 42, 44 and 46 rather than a LAN.

The system operates as follows as described in conjunction with the flow charts of FIGS. 3-9.

Figure 3:
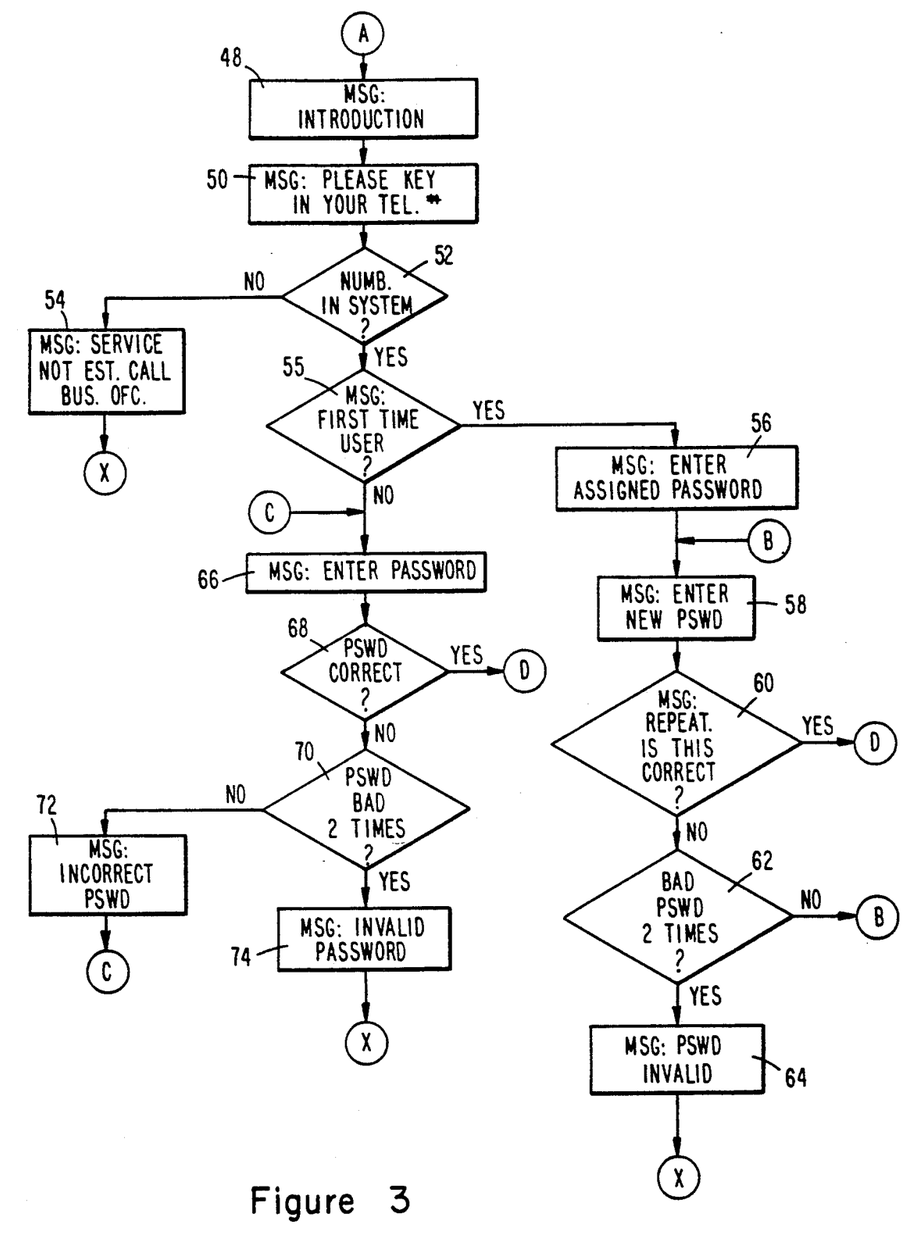
FIGS. 3 and 4 are schematic representations in the form of flow charts illustrating the main menu or methodology of the invention.

Referring to FIG. 3 a subscriber who desires to establish a personal directory according to the invention dials the Personal Electronic Directory Number (PEDN) and keys in the PIN number which was provided to him/her by the telephone company business office when the subscription to PED was made. This commences the establishment of the subscriber's personal and private directory and is indicated at A in FIG. 3. The subscriber is here greeted with a verbal introduction to the system and service as indicated at 48. The VRU provides the introduction which may be as follows:

"Welcome to the Bell Atlantic Personal Electronic Directory. This system allows you to store, retrieve, change or erase names and numbers by speaking into the telephone. When you retrieve a local number, you may also have it automatically dialed for an additional charge.

Whenever you call your directory, remember to wait for the beep and speak clearly."

The system next proceeds to 50 with a prompt, such as:

"Please say your telephone number now" (beep).

The system proceeds to 52 where the OLTP searches its subscriber memory to verify that the number is in the system. If the number is not in the system as indicated at 54 the VRU provides a prompt such as:

"Sorry but service at this number has not yet been established. Please call the business office."

Figure 4:
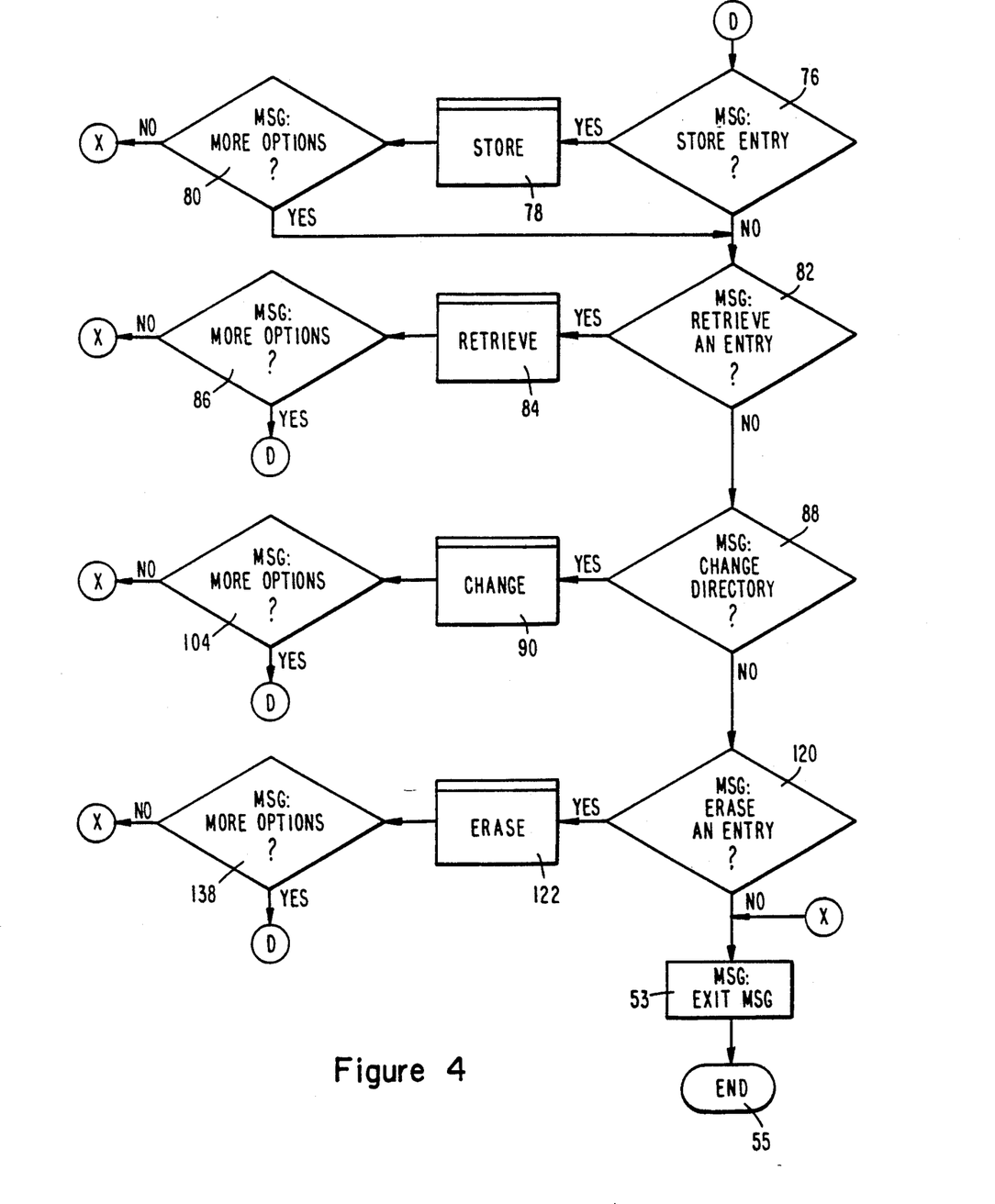

The program then continues to an exit message as indicated at X. Referring to FIG. 4 the VRU at 53 provides a prompt such as:

"Thank you for calling Bell Atlantic Personal Directory Listing."

There is then a disconnect at 55.

If the determination at 52 indicates that the caller's number is in the system a determination is next made by the OLTP at 55 as to whether the caller is a first-time user. Thus the VRU may provide a prompt such as:

"Is this the first time that you used your personal electronic directory? Please answer 'YES' or 'NO'."

The subscriber responds with a YES or NO answer. According to the preferred embodiment of the invention the VRU unit includes the capability of recognition of the spoken alphabet, the numbers 0-9, and the words "YES" and "NO".

If the response is affirmative the VRU proceeds with password establishment at 56 and 58. When the service is originally subscribed and established with the business office the subscriber's directory number is stored and the last four digits of that number are designated as a temporary password. Thus at 56 the VRU provides a prompt such as:

"Please say your telephone number now (beep). Please repeat the last four digits of your telephone number (beep)."

The system now proceeds to the storage of a new customer selected password at 58. Thus the VRU may issue a prompt such as:

"Say four new letters or numbers which will be your new password (beep)."

Verification of the new password now occurs at 60. The VRU may provide a prompt such as:

"Your new password is - - - -. Is that correct?"

As indicated at 62 and 64 the user is provided two opportunities to enter a correct storable password. In the case of failure the program proceeds to the exit message at X followed by disconnect as previously described. If the password is correct in response to the determination at 60 the OLTP next proceeds from 68 in FIG. 3 to the main menu at D in FIG. 4.

A non-first time user of the system may proceed directly from A to C by depressing a predesignated key, such as for example, 1. A validation of that user's password is then performed as indicated at 68, 70, 72 and 74 in FIG. 3. In the case of an invalid password the connection is terminated by the exit procedure at X. In the case of a correct password determination at 68 the OLTP/VRU next proceeds to the main menu at D in FIG. 4. Turning to FIG. 4, at 76 the VRU inquires as to whether the user desires to store an entry. Such an inquiry or prompt may be:

"Would you like to store a listing in your directory?"

Figure 5:
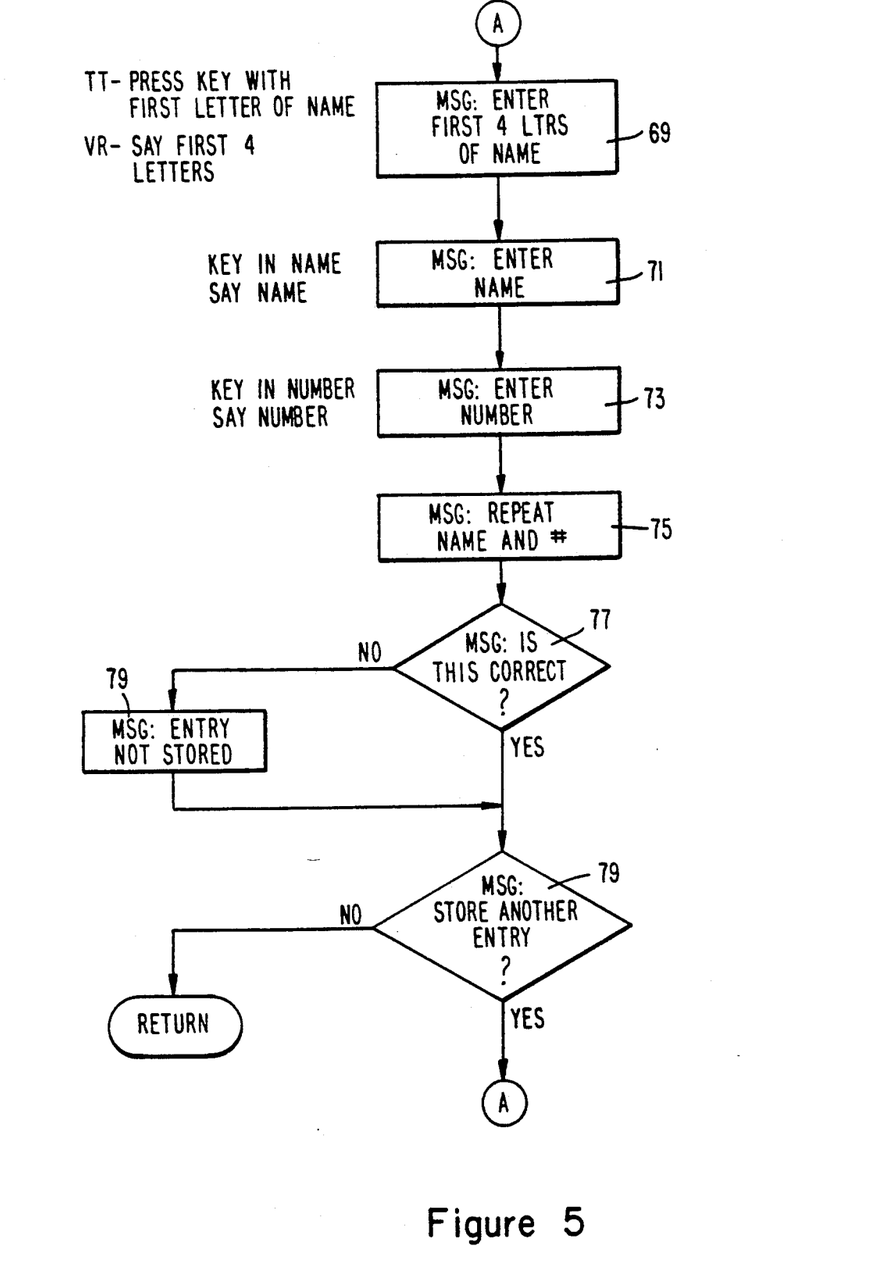
FIG. 5 is a schematic representation in the form of a flow chart illustrating the creation or storage methodology of the invention.

If the answer is affirmative the OLTP and VRU next proceed to the store routine as indicated at 78 in FIG. 4 and illustrated in detail in FIG. 5. Turning to FIG. 5 the "store" sub-program commences at A and proceeds to 69. At this point the VRU may issue a prompt such as:

"Please say the first four letters of the name you want stored (beep)."

The subscriber speaks the four letters which are stored in a digitization of the speaker's voice for speech recognition purposes upon future usage.

The sub-program now proceeds to 71 where the VRU may issue a prompt such as:

"Now say the full name (beep)."

The subscriber now speaks the full name which is digitized and stored in the subscriber's voice.

The sub-program now proceeds to 73 where the VRU issues a prompt such as:

"Say the telephone number, one number at a time, after each beep (beep)."

The subscriber speaks the number digit by digit and this is digitized and stored in the subscriber's voice.

The system next proceeds to 75 and 77 where the VRU issues a prompt such as:

"You have recorded (the system repeats in the subscriber's voice, for example, MARY SMITH, 555-1234)."

"Is that correct?"

If the response in negative the system proceeds to 79 where the VRU issues a prompt such as:

"The entry has not been stored."

The sub-program then proceeds to 79. The OLTP/VRU determines at 79 whether the user would like to store another listing. Thus the following prompt may follow:

"Would you like to store another listing?"

If the answer is affirmative the sequence illustrated and described in relation to FIG. 5 is repeated. If the subscriber desires to correct the incorrect listing that may be accomplished by a YES response. This completes the "store" sub-program of FIG. 5 and the program returns to 80 in FIG. 4.

At this point a determination is made at 80 as to whether the caller would like another option. Thus the VRU may provide an inquiry such as:

"Would you like another option?"

If the response is negative the Exit message is provided at X and disconnection occurs. If the response is affirmative the program continues at 82.

At 82 a determination is made as to whether or not the caller desires to retrieve an entry. Thus the VRU may provide a prompt such as:

"Would you like to retrieve a listing?"

Figure 6:
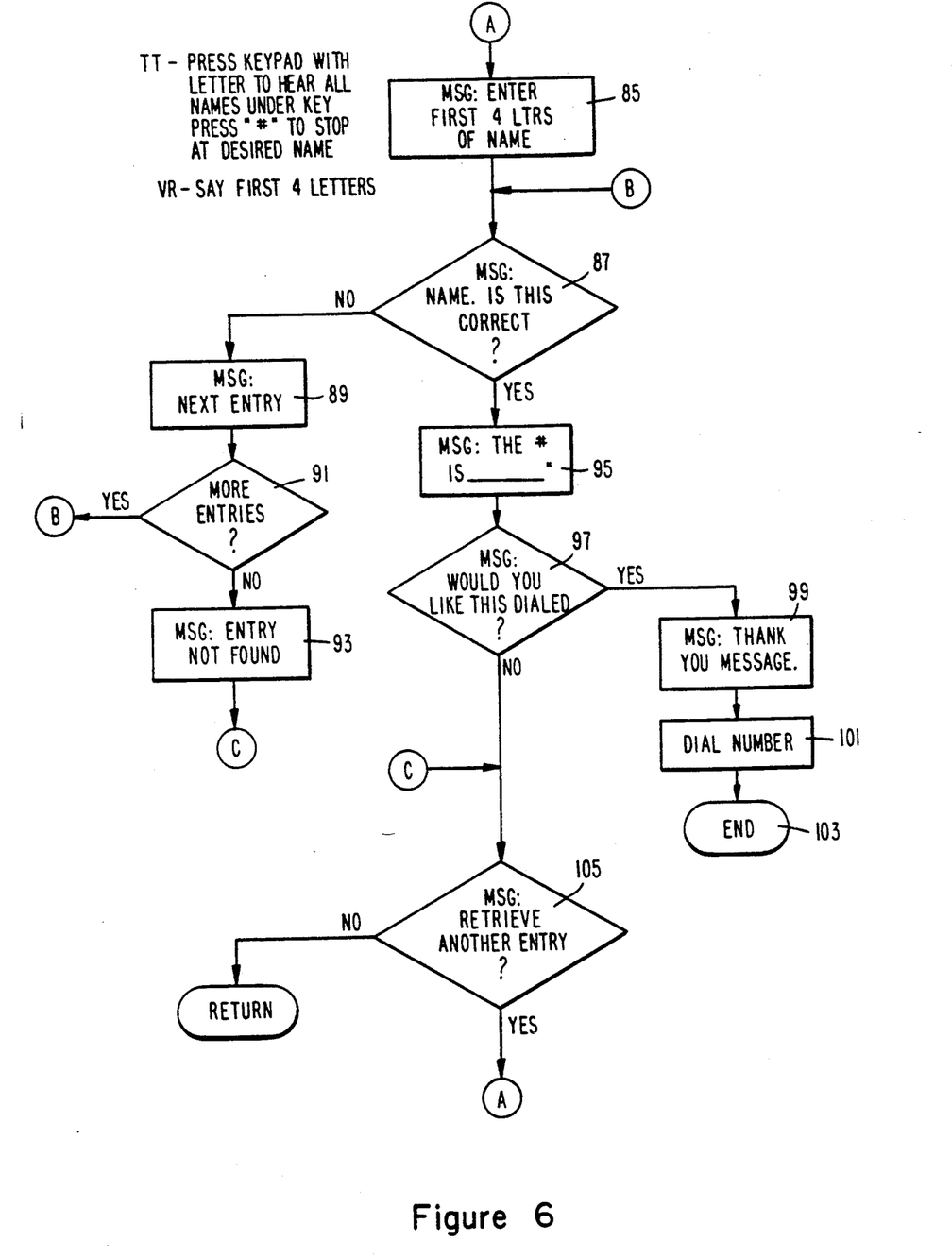
FIG. 6 is a schematic representation in the form of a flow chart illustrating the telephone number retrieval methodology of the invention.

If the answer is affirmative the OLTP/VRU proceeds to the "retrieve" sub-program at 84. This is illustrated in detail in FIG. 6. The sub-program is entered at A and proceeds to 85. Here the VRU may provide a prompt such as:

"Please say the first four letters of the name you want retrieved. Remember to wait for the beep and speak clearly (beep)."

Upon the caller speaking the first four letters of the name to be retrieved the sequence proceeds to 87 where VRU says the name in the voice of the subscriber in a prompt such as: "MARY SMITH. Is that it?"

If the response is negative the OLTP/VRU proceeds to 89 and to the next entry stored in the file of that caller under those four letters, such as:

"MARY JONES. Is that it?"

Again the name is in the voice of the subscriber. The system then proceeds at 91 through all listings for that subscriber under the four letter spoken designation until the list is exhausted. When this occurs at 93 the VRU provides a prompt such as:

"Sorry, that listing is not found. Would you like to retrieve another listing?"

In the event of an affirmative response the procedure is repeated for the additional listing.

If the subscriber gives an affirmative response at 87 in FIG. 6 the sub-program proceeds to 95. At this point the VRU provides a prompt such as:

"The number is XXX-XXXX. Repeat, the number is XXX-XXXX."

The spoken number is in the voice of the subscriber. If this number is local this will be determined by the OLTP at 97 and the VRU prompt will continue:

"This number can be automatically dialed for an additional charge of $X. Would you like this number automatically dialed?"

If the response is affirmative the sub-program proceeds to 99 where the VRU provides a prompt such as:

"Thank you."

The OLTP thereupon directs the VRU to perform the dialing at 101. In so doing the VRU holds the original line and uses a second line and out port in order to complete the connection. Upon the called station going off-hook, or upon a busy/no answer signal and the calling subscriber going on hook, the program ends at 103.

If the response to the dialing inquiry at 97 was negative the sub-program of FIG. 6 proceeds to 105 where the VRU provides a prompt such as:

"Would you like to retrieve another listing?"

If the response is affirmative the sub-program of FIG. 6 is repeated. If the response is negative the caller is returned to the main menu at 86.

At this point the system inquires as to whether the caller desires another option. Thus the VRU may provide a prompt such as:

"Would you like another option?"

If the response is affirmative the system proceeds to the main menu at D. If the response is negative the program proceeds to the closing prompt at X and disconnection then occurs.

It is to be noted that in all instances the listed name and telephone number sought by the subscriber are provided to the subscriber vocally in the subscriber's own voice in which it was initially stored.

Figure 7:
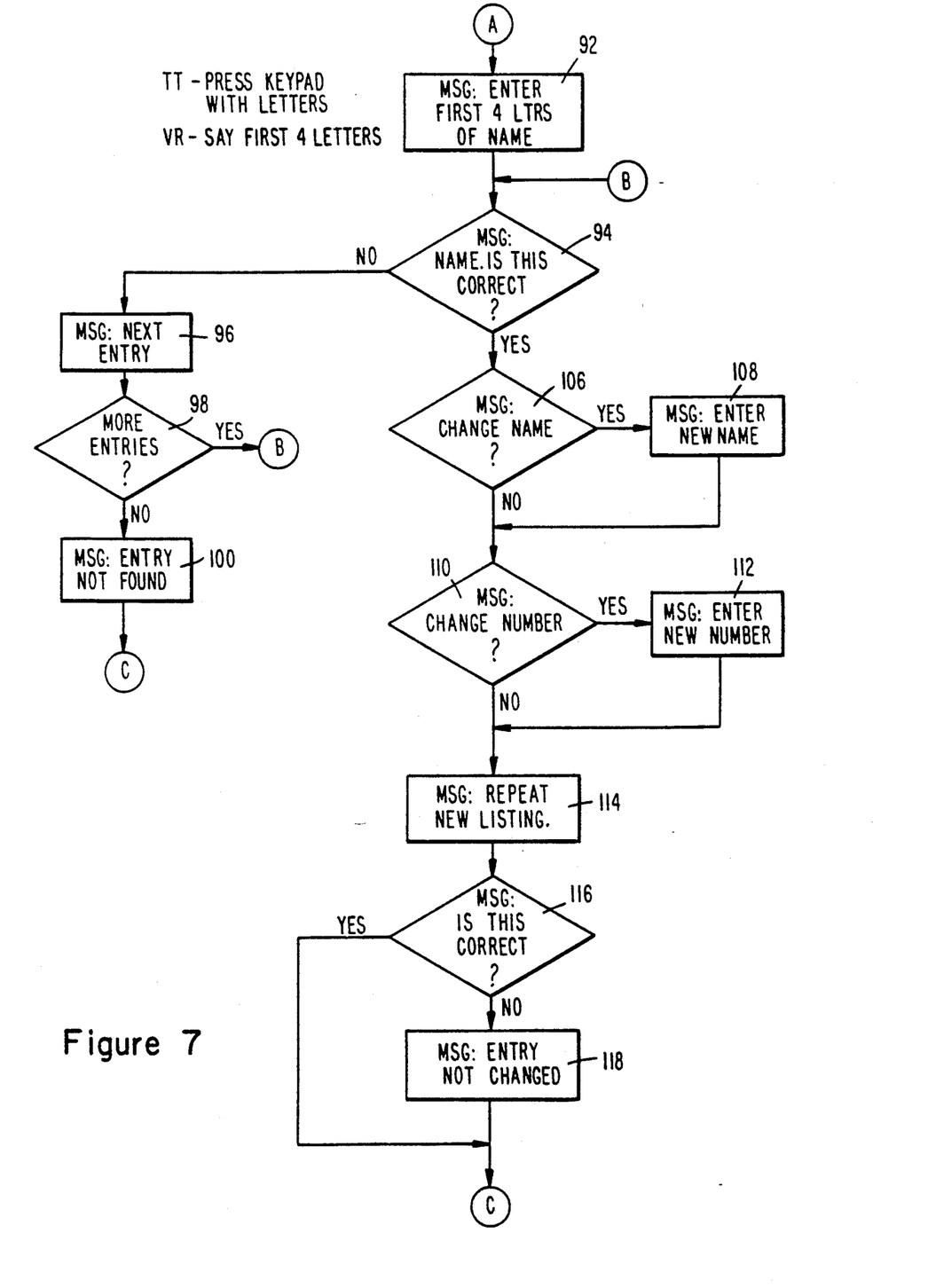
FIG. 7 is a schematic representation in the form of a flow chart illustrating the methodology of the invention for effecting subscriber change in his/her directory.

The next option in the main menu is indicated at 88 and is illustrated in detail in FIG. 7. If the decision at 88 indicates that a change in the directory is desired the OLTP/VRU proceed to the change sequence indicated at 90 in FIG. 4.

Referring to FIG. 7 the user enters at A and the VRU at 92 provides a prompt such as:

"Please say the first four letters of the name of the listing you want to change. Remember to wait for the beep and speak clearly (beep)."

Assuming the caller says the name "MARY SMITH", the system searches the name and at 94 the VRU provides the response:

"MARY SMITH. Is that it?"

If the response is negative the system proceeds through the other listings in the file of that subscriber under the four letters provided as indicated at 96. Thus the VRU may provide a prompt such as:

"MARY JONES. Is that it?"

This continues through 98 until an affirmative response is entered. In the event of no affirmative response the system proceeds to 100 and the VRU provides a prompt such as:

"Sorry, that listing is not found."

Figures 8, 9:
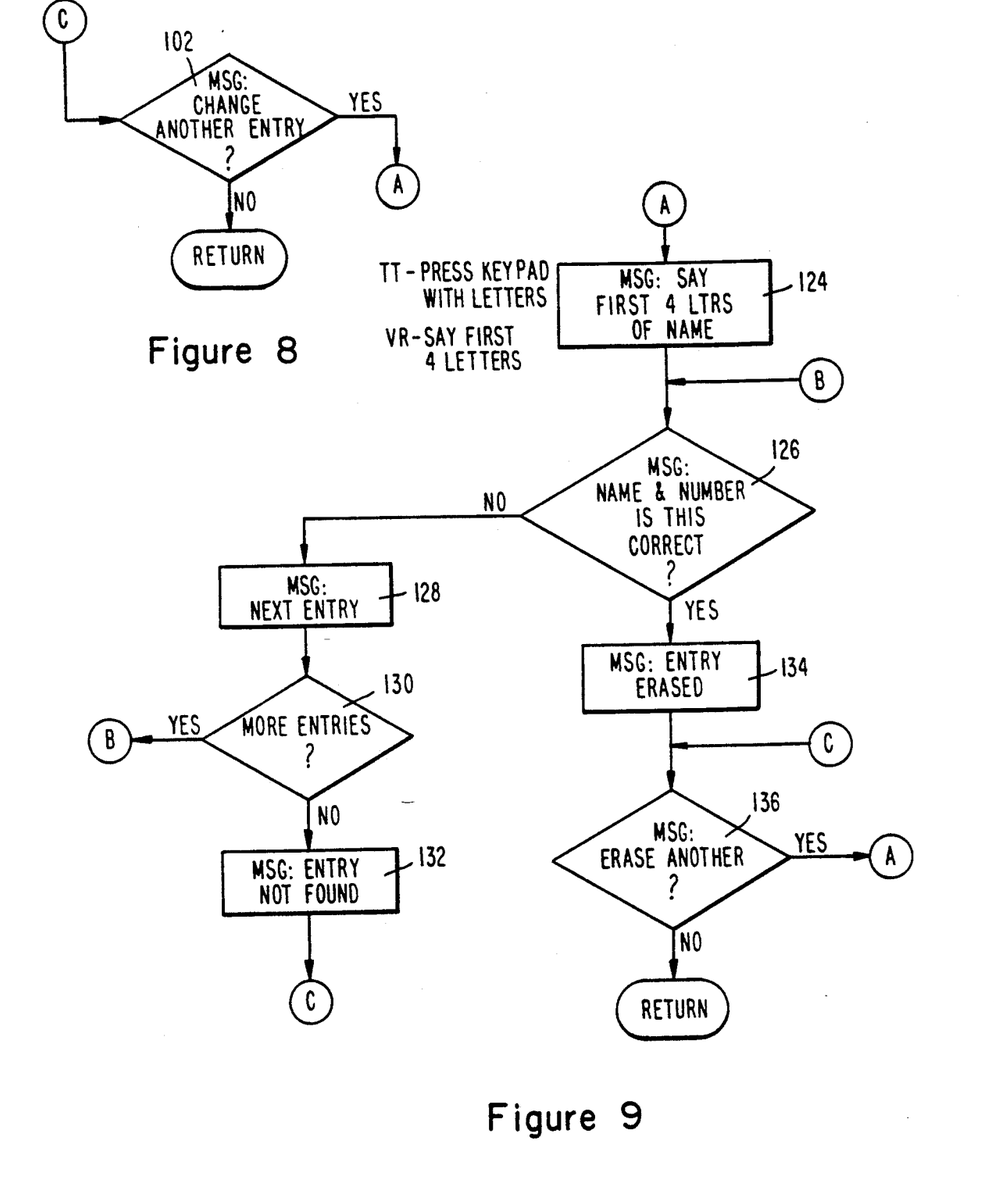
FIG. 8 is a schematic representation in the form of a flow chart illustrating one aspect of the change methodology of the invention.
FIG. 9 is a schematic representation in the form of a flow chart illustrating the subscriber effected erase methodology of the invention.

The sequence then proceeds to C in FIG. 8. As indicated at 102 the VRU provides a prompt such as:

"Would you like to change another listing?"

In the case of an affirmative response the sequence proceeds from A in FIG. 8 to A in FIG. 7 and the FIG. 7 sequence is repeated. If the determination at 102 results in a negative response the caller is returned to 104 in FIG. 4 and is asked if he/she would like another option. In the case of an affirmative response the procedure returns to the main menu at D in FIG. 4.

Once the desired name is located in the subscriber's directory the "change" sub-program proceeds to 106 in FIG. 7 with a prompt such as:

"Would you like to change this name?"

In the event of an affirmative response the name entry procedure is entered at 108. The system then repeats the procedure for storing a name as indicated at 78 in FIG. 4 and as described in detail in connection with FIG. 5.

If the caller indicates that a name change is not desired the system next proceeds to 110 in FIG. 7 to inquire as to whether the caller desires to change a number. The VRU provides a prompt such as:

"Would you like to change a number?"

If the response is affirmative the system proceeds to 112 and repeats the steps for storage of a number as indicated at 78 in FIG. 4 and as described in detail in connection with FIG. 5.

If the determination at 110 is negative and establishes that a number change is not desired (assuming that some change in the listing had been made) the system proceeds to 114 wherein the VRU vocally repeats the new listing. At 116 the program ascertains whether or not this listing is correct. Thus the VRU may provide a prompt such as:

"Is this listing correct?"

If the response is affirmative the system proceeds from C in FIG. 7 to C in FIG. 8 wherein the steps there shown and described are repeated as previously described.

If the response at 116 is negative, indicating that the new entry is not correct, the sequence proceeds to 118 and the VRU provides a prompt such as:

"You have indicated that the new entry is not correct. The original entry remains unchanged."

The system then proceeds to C in FIG. 8 as above described. At this point the subscriber may correct the incorrect entry if desired. If the response at 102 is negative the program returns to the main menu illustrated in FIG. 4 at 104 and thence to 120 in the case of an affirmative response. At 120 the system determines whether the caller desires to erase an entry. The VRU provides a prompt such as:

"Would you like to erase a listing?"

If the response is affirmative the system proceeds to the erase sequence at 122. This is illustrated in detail in FIG. 9. Referring to FIG. 9 entry is made at A and at 124 the VRU provides a prompt such as:

"Please say the first four letters of the name you want erased. Remember to wait for the beep and speak clearly (beep)."

The system OLTP thereupon conducts its search and at 126 commands the VRU to say the recorded name and number in the voice of the subscriber, for example: "MARY SMITH, 555-1234. Is that it?"

In the event of a negative response the system proceeds through the listing search procedure as indicated at 128, 130 and 132 as described above at 96, 98 and 100 in FIG. 7.

Assuming that the correct listing has been found and an affirmative response results at 126 the OLTP effects erasure of the previously stored listing at 134. The caller is next queried at 136 as to whether the erasure of another listing is desired.

In the event of an affirmative response the procedure indicated at 124–134 is repeated. If the response is negative the system returns to the conclusion of the erase procedure at 138 in FIG. 3. There the caller is asked whether any further options are desired.

In the case of an affirmative response the caller returns to the main menu at D in FIG. 4. In the event of a negative answer the system proceeds to the exit procedure at X in FIG. 4.

The above described system utilizing vocalized alphanumeric and YES/NO input permits usage of reliable and inexpensive voice recognition units such as VOICE CONTROL SYSTEMS, DALLAS, TEX., in the VRU units. This vastly simplifies the ambiguity resolution problem and eliminates the tedium and tendency to error in extended alphabetic entries using a DTMF key board. The system is user friendly, easy to use, and as convenient as the closest DTMF telephone. It provides the security and privacy of central office stored numbers and provides names and numbers that are stored and repeated in the subscriber's voice. As an additional feature the system may be provided with automatic dialing whereby the user, upon locating the desired number in his/her directory may press the "*" symbol to have the number automatically dialed. This may be effected in the VRU unit to which the caller is connected by utilizing a second port in that unit to dial the number. Sufficient ports may be provided by the simple addition of additional VRU units which may be connected to the OLTP either by asynchronous lines or a LAN.

While the preferred embodiment of the invention utilizes spoken letters, numbers, names, and YES and NO responses, the invention may be practiced according to another embodiment using DTMF keyboard entries. While this embodiment of the invention must cope with the ambiguity problems presented by the use of a DTMF keyboard, the magnitude of the problem is very significantly reduced in the case of the personal directory of this invention. Still further, a personal directory user will relatively quickly become aware of ambiguities which may exist in his/her directory and simply use nicknames or different spellings to eliminate that problem. Also the user has the option of entering either the first four letters of the surname or first name.

The invention provides a high degree of privacy and security in that outside knowledge of a subscriber's PIN number will not permit access to the subscriber's personal directory. Such access depends on a subscriber selected password or code number which may be changed by the subscriber at will from any DTMF telephone.

The PED system of the invention utilizes available equipment and is subject to easy incorporation in existing telephone networks. A single OLTP/VRU installation may serve the area served by a Remote Memory Administration System (RMAS) or a MIZAR computer or may serve a given LATA. The capacity of the system is readily expandable by the addition of VRU units.

Still other advantages of the present invention will be apparent to those skilled in the art from the foregoing detailed description, wherein only the preferred embodiment of the invention is shown and described, simply by way of illustration of the best mode contemplated of carrying out the invention. As will be realized the invention is capable of other and different embodiments without departing from the invention. Accordingly the drawings and descriptions are to be regarded as illustrative and not restrictive in nature.

I claim:

1. In a telecommunications system having a plurality of switching means interconnected by trunks, a plurality of subscriber stations arranged in groups with each group being served by one of said switching means, a plurality of subscriber lines connecting each switching means with the group of subscriber stations served thereby, a switching network in each switching means for establishing communication paths between calling subscriber stations and called subscriber stations addressed by the calling stations, the improvement comprising:

adjunct means associated with at least one of said switching means;
   multiline hunt group means associated with a personal directory service access number;
   said adjunct means including:
   voice response means connected to said multiline hunt group means, and
   processor means responsive to subscriber identification for performing the following functions (a) recognizing that a subscriber selected name and telephone number is to be stored in a selected memory provided to that subscriber from among a plurality of memories dedicated to other subscribers and for storing multiple names and telephone numbers inputted by audio signals originated by that subscriber to said multiline hunt group means and including an alphabetic address of predetermined length for each telephone number, and (b) recognizing in response to audio signals that said subscriber is seeking access to one of said telephone numbers stored for that subscriber,
   said voice response means generating an audio signal repeating the telephone number requested by that subscriber by the alphabetic address, and providing to said subscriber audio instructions for storing and retrieving said personal directory numbers.

2. A telecommunications system improvement according to claim 1 wherein said processor means further performs the changing of the subscriber identification responsive to subscriber request.

3. A telecommunications system improvement according to claim 1 wherein said processor means further performs the changing or erasing of names or telephone numbers previously stored for said subscriber responsive to subscriber request.

4. A telecommunications system improvement according to claim 1 wherein said adjunct means includes means responsive to subscriber request for automatically dialing telephone numbers retrieved for said subscriber.

5. A telecommunications system improvement according to claim 1 wherein an audio signal representing said alphabetic address is generated by a DTMF keypad actuated by said subscriber.

6. A telecommunications system improvement according to claim 1 wherein an audio signal representing said alphabetic address is generated by said subscriber articulating letters of the alphabet for the predetermined length of said alphabetic address.

7. A telecommunications system improvement according to claim 1 wherein said names and telephone numbers are stored in a digitized form representing the voice of the subscriber and are repeated to the subscriber in an audio reproduction of the subscriber's voice.

8. A telecommunications system improvement according to claim 1 wherein said subscriber may store names and numbers in a personal directory and retrieve numbers from said personal directory from any DTMF telephone.

9. A telecommunications system improvement according to claim 6 wherein said subscriber may store names and numbers in a personal directory and retrieve numbers from said personal directory from any DTMF telephone.

10. A telecommunications system having a plurality of switching means interconnected by trunks, a plurality of subscriber stations arranged in groups with each group being served by one of said switching means, a plurality of subscriber lines connecting each switching means with the group of subscriber stations served thereby, a switching network in each switching means for establishing communication paths between calling subscriber stations and called subscriber stations addressed by the calling stations, the improvement comprising:

an adjunct means associated with at least one of said switching means;

multiline hunt group means associated with a personal directory service access number;

said adjunct means including:

voice response and recognition means connected to said multiline hunt group means, and processor means responsive to subscriber identification for performing the following functions (a) recognizing that a subscriber selected name and telephone number is to be stored in a selected memory provided to that subscriber from among a plurality of memories dedicated to other subscribers and for storing multiple names and telephone numbers inputted by audio signals originated by that subscriber to said multiline hunt group means and including an alphabetic address of predetermined length articulated by said subscriber for each telephone number, and (b) recognizing in response to spoken audio signals that said subscriber is seeking access to one of said telephone numbers stored for that subscriber, said voice response and recognition means generating an audio signal repeating the telephone number requested by that subscriber by the alphabetic address, and providing to said subscriber audio instructions for storing and retrieving said inputted telephone numbers.

11. A telecommunications system improvement according to claim 10 wherein said processor means further performs the changing of the subscriber identification responsive to subscriber request.

12. A telecommunications system improvement according to claim 10 wherein said processor means further performs the changing or erasing of names or telephone numbers previously stored for said subscriber responsive to spoken subscriber request.

13. A telecommunications system improvement according to claim 10 wherein said adjunct means includes means responsive to spoken subscriber request for automatically dialing telephone numbers retrieved for said subscriber.

14. A telecommunications system improvement according to claim 10 wherein said names and telephone numbers are stored in a digitized form representing the voice of the subscriber and are repeated to the subscriber in an audio reproduction of the subscriber's voice.

15. A telecommunications system improvement according to claim 10 wherein said subscriber may store names and numbers in a personal directory and retrieve numbers from said personal directory from any DTMF telephone.

* * * * *